March 5, 1940.　　F. J. STEPHAN　　2,192,245

ADJUSTABLE DEPTH GAUGE

Filed Oct. 22, 1937　　2 Sheets-Sheet 1

Inventor
Frank J. Stephan
By: Hill & Hill
Attys

Witness
V. Siljander

March 5, 1940.  F. J. STEPHAN  2,192,245
ADJUSTABLE DEPTH GAUGE
Filed Oct. 22, 1937  2 Sheets-Sheet 2
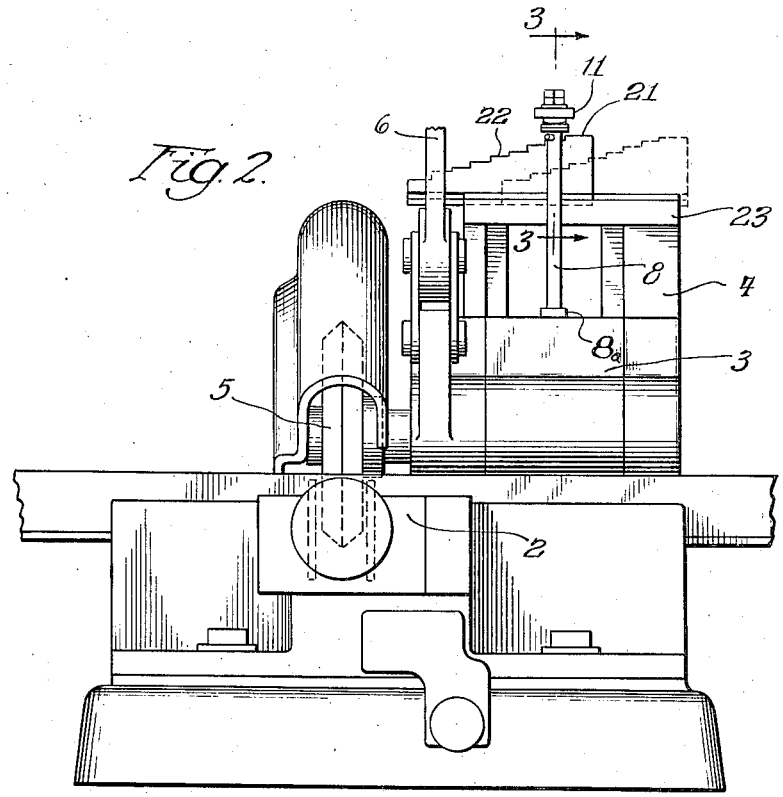
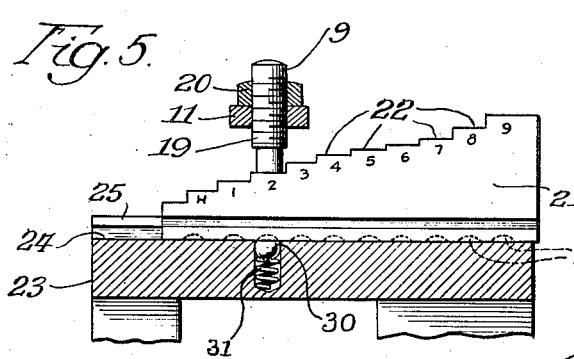
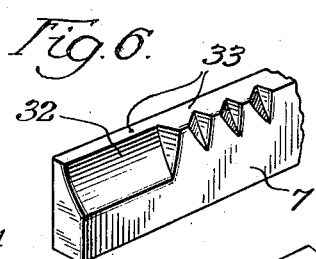
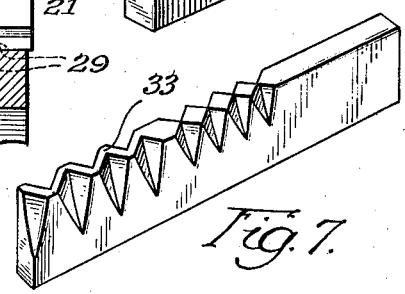
Witness:
V. Siljander
Inventor
Frank J. Stephan
By: Hill & Hill
Attys.

Patented Mar. 5, 1940

2,192,245

UNITED STATES PATENT OFFICE 2,192,245

ADJUSTABLE DEPTH GAUGE

Frank J. Stephan, Chicago, Ill., assignor to H. B. Rouse & Co., Chicago, Ill., a corporation of Illinois Application October 22, 1937, Serial No. 170,409

4 Claims. (Cl. 90—15)

The invention relates to mitering machines, particularly those used for mitering or beveling the edges of printers' rules and the like, and more particularly to gauges for determining the horizontal depth of cuts made in such rules.

The invention has among its objects the production of a gauge which is simple in construction, inexpensive to manufacture, convenient to use, durable and efficient.

The invention has as a further object the production of a gauge which may be readily and easily adjusted for making cuts of various depths, and which will at all times maintain the particular adjustment made until again manually changed.

Another object of the invention is the production of a gauge in which any particular adjustment is readily apparent to the operator of the machine, and in which the correct adjustment may be easily determined.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

The gauge hereinafter described may be used in conjunction with various types of machines and for illustrative purposes the machine shown and described in the specification and drawings is similar to the one more explicitly described in Patent No. 1,980,502 issued to Harry B. Rouse, November 13, 1937.

In the drawings wherein like reference characters indicate like or corresponding parts;

Fig. 2 is a front view of the same machine;

Fig. 5 is a sectional view taken on the line 5—5 of Fig. 3;

Fig. 6 is a perspective of a form of product possible with the combination of such a machine and the gauge;

Fig. 7 is a perspective view of another form of product; and

Fig. 8 illustrates some of the figures and borders possible with the machine using ordinary printers rule.

Figure 1:
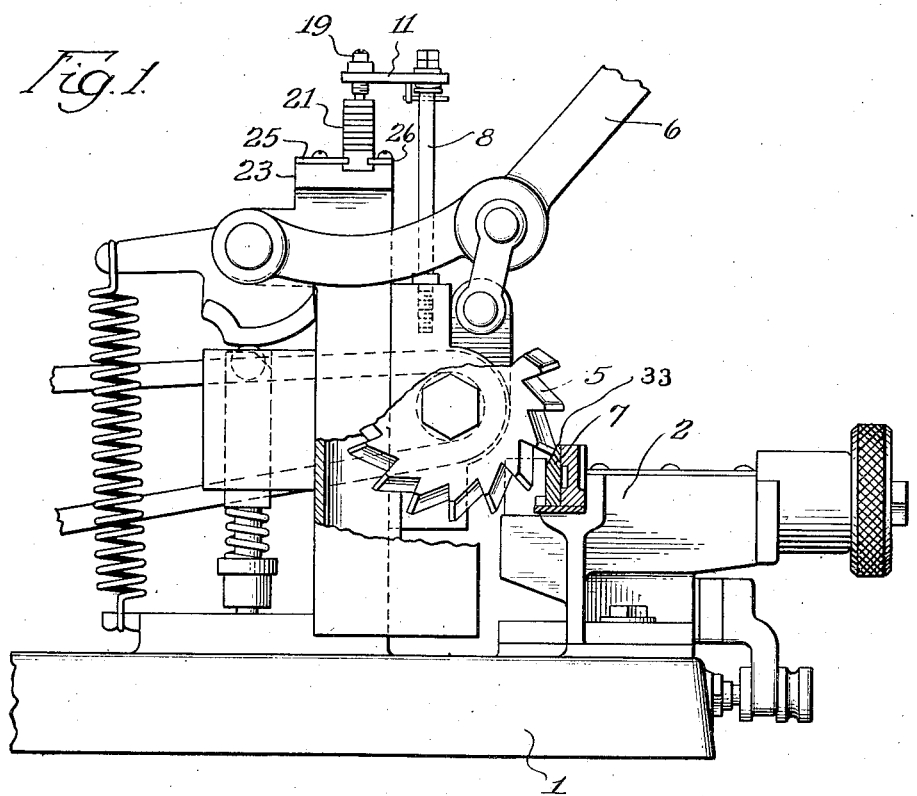
Fig. 1 is a side view of one type of machine with parts broken away and parts in section.

In Figs. 1 and 2 is shown such a machine, essentially comprising a base 1, having a workholder 2 mounted thereon, adapted to hold the particular work to be mitered or cut, and a head 3 is reciprocally mounted on the frame or guideway 4, said frame being rigidly mounted on the base 1. A rotary cutter 5 is carried by the head 3 and is placed in cutting position by manually operating the handle 6, thereby moving the cutter 5 past the stock 7 held in the workholder 2.

In certain classes of work it is desirable that the cutter 5 cut the stock or rule to a pre-determined horizontal depth only, as in making borders or the like similar to that shown in Figs. 6, 7, and 8. To enable this type work to be done on such a machine an adjustable depth gauge is provided.

Figure 3:
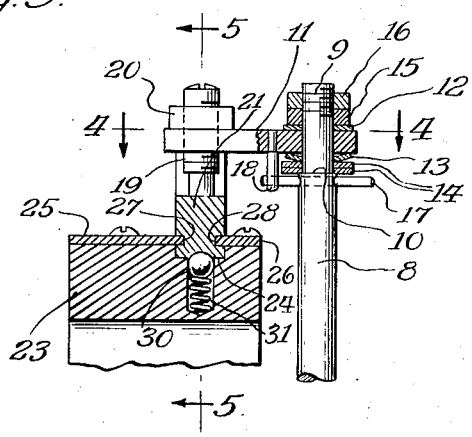
Fig. 3 is a partial sectional view of the gauge, taken along the line 3—3 of Fig. 2.

This device comprises a rod 8, one end of which is threaded into the head 3, with the opposite end extending or projecting thereabove. A lock nut 8a is provided to maintain the rod 8 rigidly in position. As shown in Fig. 3, the projecting end of the rod 8 is also threaded, the threaded portion 9 being of a diameter smaller than that of the rod 8 thus forming the shoulder 10.

Figure 4:
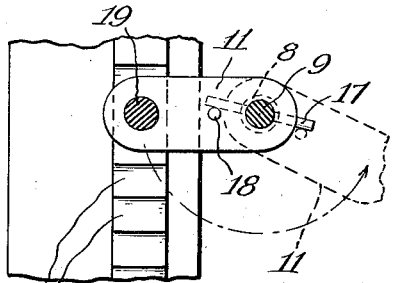
Fig. 4 is a sectional view of the gauge taken on the line 4—4 of Fig. 3.

A small transverse plate 11 is positioned on the portion 9 of the rod 8, between the flat washer 12 and the spring washer 13, the latter in turn resting on the flat washers 14 which seat on the shoulder 10. These parts are maintained in assembled relation by the nut 15 and the lock nut 16. The plate 11 is firmly held by the spring washer 13 and lock nut 15 and 16 from any movement in a direction parallel to the rod 8, but the nuts are not tightened down sufficiently to lock the plate 11 immovably to the rod 8, so that the plate may be rotated about said rod, when force is applied sufficient to overcome the friction exerted by the washer 13, if it is desired to have the depth gauge inoperable as shown with dotted lines in Fig. 4. To limit this rotation of the plate 11 and also to assure its return to proper operative position, a pin 17 extends transversely through the rod 8 substantially adjacent the shoulder 10 thereof and a second pin 18 extends from the plate 11, parallel to the rod 8 and of a length to engage the pin 17 as shown in Figs. 3 and 4.

A stud 19 is threaded into the plate 11 adjacent the projecting end thereof parallel to the rod 8, and is securely held in place by means of the lock nut 20. Any primary adjustment of the gauge relative to the workholder is made by merely slightly screwing the stud in or out of the plate 11.

A gauge block 21 is provided with a plurality of stepped parallel faces 22, said block being so located on the machine that any one of the faces 22 may be selectively positioned in the path of, and engageable with, the stud 19, operative to limit the movement of the stud and assembly which in turn would limit the movement of the head 3 and cutter 5 at a previously determined depth, depending on the vertical thickness of the gauge block 21 at the particular face or step which is positioned in the path of the stud 19 at that particular time.

A base block 23 located on the frame 4 of the machine carries the gauge block 21, the base block being formed with a groove 24 therein, of a size to receive said gauge block, while guide plates 25 and 26 engage the lateral grooves 27 and 28 respectively, located on the sides of the gauge block 21, to prevent any vertical movement of the same when in use. The gauge block, however, may be moved laterally along the groove 24, to selectively position any one of the plurality of parallel faces 22, located thereon, in the path of the stud 19.

To maintain the face selected in proper position to engage the stud 19, the bottom of the gauge block 21, adjacent the groove 24, is provided with a series of spaced indents 29, one opposite each of the parallel faces or steps 22. A small metal ball 30, of a size to partially enter the indents, is inset in the goove 24 of the base block 23, while a spring 31 maintains the ball 30 in contact with the gauge block 21, thus maintaining the latter in proper position with respect to the stud 19 and also eliminating possibility of accidental displacement of the gauge block.

In operation the work 7 is placed on and held by the workholder 2, or equivalent means, and the gauge block is then positioned with that face in the path of the stud 19 necessary to give a cut of the desired depth. As the handle 6 is brought down, the cutter 5 is brought into contact with the work 7 and when the desired depth of cut has been reached, the stud 19 will engage the proper face of the gauge block, thus preventing any further cutting movement between the cutter 5 and the stock or work 7.

If it is desired to cut figures similar to those shown in Fig. 8, such as arrows, brackets or the like, or it is desired to diminish the thickness of the rule, the depth gauge is first properly positioned, after which the handle 6 is brought down, thus bringing the cutter in contact with the work. The latter is then moved laterally along the workholder, past the cutter which will then make a lateral cut 32 on the rule as shown in Fig. 6. With a little ingenuity in changing the position of the depth gauge and in varying the amount of lateral cut, many novel and decorative borders, figures and the like may be made with a machine embodying the features described in this application.

Necessary indicia to enable an operator to readily determine the proper face of the gauge block to use for a desired cut may be stamped or otherwise marked on the gauge block or base as desired.

In the preferred embodiment of my invention, these faces are marked as shown in Fig. 2, H, 1, 2, 3, 4, 5, 6, 7, 8, and 9 from the face at which the vertical thickness of the block is the smallest to the face at which it is the greatest, respectively. The vertical thickness of the gauge block at the respective faces is carefully determined so that when the gauge is positioned with the face marked "H" in the path of the stud 19, and a lateral cut 32, as shown in Fig. 6, is made, the portion 33, remaining will be of hairline width. Likewise, if face 1 is used instead of face H, the portion 33 will be of one-point thickness so on up to nine points. Thus, the operator may instantly set the depth of cut to any one of ten positions ranging from hairline to the heavier faces, enabling decorative border and rule shearing work to be done rapidly and accurately.

While the gauge, for illustrative purposes has been shown on a machine of the type described, in which the workholder is stationary and the cutting head and wheel move relative thereto, obviously, the device may be readily adapted to and attached on other types of machines, as, for example, those machines in which the cutting head is stationary and the workholder is movable relative thereto.

Having thus described my invention, it is obvious that various immaterial modifications may be made in the same without departing from the spirit of my invention; hence, I do not wish to be understood as limiting myself to the exact form, construction and arrangement and combination of parts shown and described or uses mentioned.

What I claim as new and desire to secure by Letters Patent is:

1. In a machine of the kind described, the combination of a workholder and cutter head, one of which is movable relative to the other, and means for limiting the movement of the movable member comprising a stop carried by one member, a gauge-block, on the other member, positioned in the path of said stop and engageable therewith, said gauge block having a plurality of parallel faces arranged to form a plurality of steps, said steps being of a size to limit the movement of the cutter and retain the cutter against the complete passage thereof laterally through the material to be cut, each step operative to stop the travel of the cutter head when the thickness of the remaining material in line with the path of the cutter is that of one of a predetermined number of printing points, and resilient means associated with said block for maintaining a selected step of the same in operative position.

2. In a machine of the kind described, the combination of a workholder and a cutter head, one of which is movable relative to the other, and means for limiting the movement of the movable element comprising a rod rigidly secured to said element, extending from and carried by the same, a transverse member attached to the projecting end of said rod, and rotatable thereabout to render said gauge inoperative, said rod and member being rigidly connected as to force applied on said member in a direction parallel to the travel of said movable element, a gauge block positioned in the path of said transverse member and engageable therewith, said gauge block having a plurality of parallel faces arranged to form a plurality of steps, said steps being of a size to limit the movement of the cutter and retain the cutter against the complete passage thereof laterally through the material to be cut, each step operative to stop the travel of the cutter head when the thickness of the remaining material in line with the path of the cutter is that of one of a predetermined number of printing points, and means associated with said block for maintaining a selected step of the same in operative position.

3. In a machine of the type described, the combination of a workholder, a frame, a head reciprocably mounted on the frame, and having a cutter, a rod rigidly secured to the same, extending from and carried by said head, a transverse member attached to the projecting end of said rod, said rod and member being rigidly connected as to force applied on said member in a direction parallel to the travel of said head and cutter, a rectangular gauge-block slidably carried on said frame, said block having a plurality of parallel faces or steps, any one of which may be selectively positioned in the path of said transverse member, and resilient means associated with said block for maintaining the same in the position selected.

4. In a machine of the type described, the combination of a workholder, a frame, a head reciprocably mounted on the frame, and having a cutter, a rod rigidly secured to the same, extending from and carried by said head, a transverse member attached to the projecting end of said rod, and rotatable thereabout to render said gauge inoperative, means associated therewith to restrict the rotation of said member about said rod, said rod and member being rigidly connected as to force applied on said member in a direction parallel to the travel of said head and cutter, a gauge-block carried on said frame, said block having a plurality of parallel faces or steps, any one of which may be selectively positioned in the path of said transverse member, said steps being of a size to limit the movement of the cutter and retain the cutter against the complete passage thereof laterally through the material to be cut, each step operative to stop the travel of the cutter head when the thickness of the remaining material in line with the path of the cutter is that of one of a predetermined number of printing points, resilient means associated with said block for maintaining the same in the position selected, and an adjustable stud carried by said transverse member, engageable with said face.

FRANK J. STEPHAN.